Jan. 13, 1970 TORAO NAGAI ET AL 3,490,053

JUNCTION TYPE CIRCULATOR

Filed Sept. 9, 1968 2 Sheets-Sheet 1

Torao NAGAI,
Sohji OKAMURA, &
Yoshio KIKUCHI,
INVENTORS

BY [signature]
Atty

Jan. 13, 1970 TORAO NAGAI ET AL 3,490,053

JUNCTION TYPE CIRCULATOR

Filed Sept. 9, 1968 2 Sheets-Sheet 2

3,490,053
JUNCTION TYPE CIRCULATOR
Torao Nagai, Sohji Okamura, and Yoshio Kikuchi, Yokohama-shi, Japan, assignors to Tokyo Shibaura Electric Co., Ltd., Kawasaki-shi, Japan, a corporation of Japan
Filed Sept. 9, 1968, Ser. No. 758,206
Claims priority, application Japan, Sept. 13, 1967, 42/58,364; Dec. 11, 1967, 42/79,037; May 21, 1968 (utility model), 43/41,253
Int. Cl. H01p *1/32*
U.S. Cl. 333—1.1 6 Claims

ABSTRACT OF THE DISCLOSURE

This junction type circulator consists of a central conducting assembly having three terminals, two gyromagnetic disks so arranged as to support therebetween the central part of the assembly and a vessel for housing the assembly and gyromagnetic disks so as to cause these members to be electrically connected to each other and also playing the role of a grounding means. The central conducting assembly acts not only as an ordinary type of central conductor, but also as a means for separating a direct current which insulates the prescribed terminals from each other for a direct current component but conducts these terminals for a high frequency component.

The present invention relates to a junction type circulator using a TEM-mode electromagnetic wave transmission line which comprises a central conducting assembly and a grounding means.

The conventional junction type circulator, for example, a strip circuit Y junction circulator, is fabricated by fitting a gyromagnetic body such as a ferrite disk to both top and bottom sides of the Y-shaped junction, namely, the central part of a central conducting member having three terminals outwardly extending at an equal interval of 120° and housing the central conducting member and ferrite disks in a vessel acting as a grounding means in such a manner that the ferrite disks are electrically connected to the central conducting member. When the ferrite is supplied with a magnetic field produced by a direct current from the outside, the above-mentioned arrangement acts as a circulator in a certain high frequency zone. More specifically, it displays a function of transmitting an electromagnetic wave of input signals only across the terminals of the central conducting member in the forward direction, namely, from the first to the second and then from the second to the third terminal, with a minimum loss of this electromagnetic energy. The aforementioned circulator is used in combining a negative resistance element with a negative resistance type high frequency amplifier, for example, a parametric amplifier, Esaki diode amplifier or the like.

There will now be described the operation of such amplifiers. An input signal introduced at the input terminal or first terminal is carried through the central part of a circulator to the second terminal where the signal is introduced into a negative resistance element connected to the second terminal, for example, a varactor or tunnel diode. The signal amplified by the negative resistance element is transmitted through the aforesaid part of the circulator to an output terminal or third terminal. In this case, the semiconductor element is connected across the second terminal and grounding means, and impressed with a D.C. bias voltage which will exhibit a prescribed differential negative resistance. The grounding means of the circulator is maintained at a grounding potential and the central conducting member thereof is supplied with a certain D.C. bias voltage which is different from the grounding potential. This bias voltage is also impressed on the first and third terminals through the central conducting member of the circulator.

Therefore where such a circulator type negative resistance amplifier was fitted to a radar apparatus or wireless receiver, there was formed through the central conducting member of the circulator a direct current circuit across the contact and terminal of the receiver, so that there was the danger of the semiconductor element being damaged by the influx of a direct current from the terminal. Further, where the gain band width product of the amplifier was insufficient, there were used a large number of circulator type negative resistance amplifiers connected in series. In this case, the negative resistance elements had different bias voltages and their operating properties were largely affected by the magnitude of the bias voltage impressed. Therefore it was necessary to adjust the bias voltage of each of the amplifiers independently to a most suitable extent. However, where a large number of the aforesaid amplifiers were connected in series, there was the drawback that the bias voltages of the semiconductor elements were all made equal through the central conducting members of the respective circulators.

Where a combination of two circulators of the aforementioned type was used as an isolator, the bias voltage impressed on the negative resistance element connected to a first circulator was also supplied through the central conducting member of a second circulator to a reflectionless termination connected thereto, so that an electric power generated by the current supplied from the source of a bias voltage was unnecessarily consumed at said matched dummy load with the disadvantage of causing this part to evolve heat. To eliminate such drawback, there has been used a process which consisted in connecting in series direct current separating means across the central conducting member of TEM-mode transmission line such as a strip circuit of coaxial circuit and the respective circulators as well as across the circulators and negative resistance elements thereby to separate a direct current component and allow the passage of a high frequency component. However, such direct current separating means was accompanied with the drawbacks that since a capacitive element was mainly used for this purpose, the amplifier arrangement was complicated, and the requirement of a support means for holding these members unavoidably rendered the entire apparatus bulky, leading to inconvenience in manufacture and the reduced mechanical strength of the entire amplifier assembly. Further in actual application, the whole apparatus had to be cooled, so that its bulkiness would demand a cooling means to have a remarkably increased capacity, resulting in great technical, as well as economic disadvantage.

The junction type circulator of the present invention consists of a central conducting assembly having at least three terminals, gyromagnetic bodies so arranged as to support therebetween the central part of the assembly from both top and bottom sides thereof and a vessel housing the conducting member and ferrite disks so as to cause these members to be electrically connected to each other and also playing the role of a grounding means. This circulator arrangement electrically insulates the prescribed terminal from each other for a direct current component and turns them on for a high frequency component. Accordingly the circulator of the present invention can be connected to other electrical parts without the necessity of providing a means for separating a direct current component, thus rendering an apparatus using this circulator substantially compact.

Figure 5:
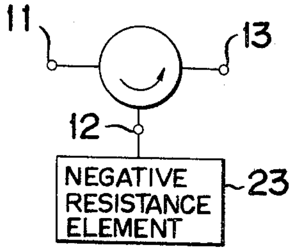
Figure 6:
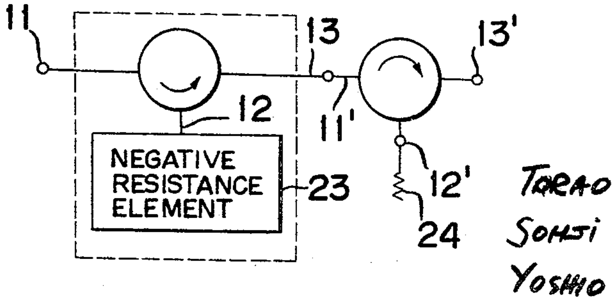
Figure 7:
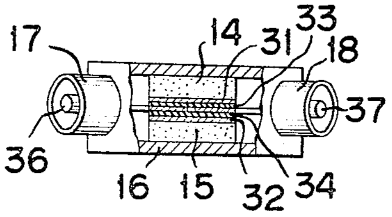
Figure 8:
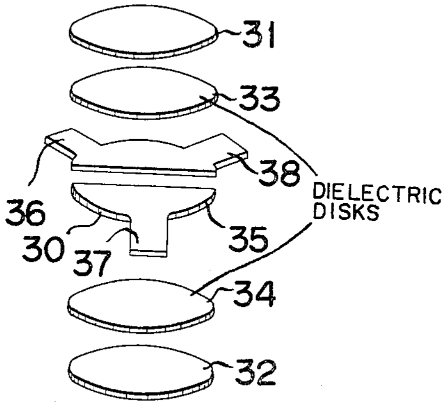
Figure 9:
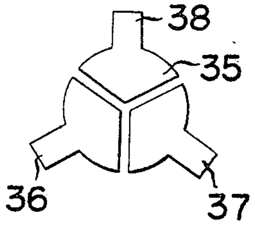
Figure 10:
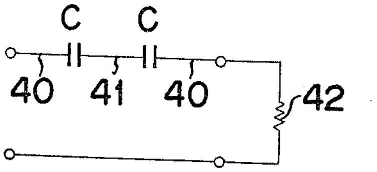
Figures 11, 12:
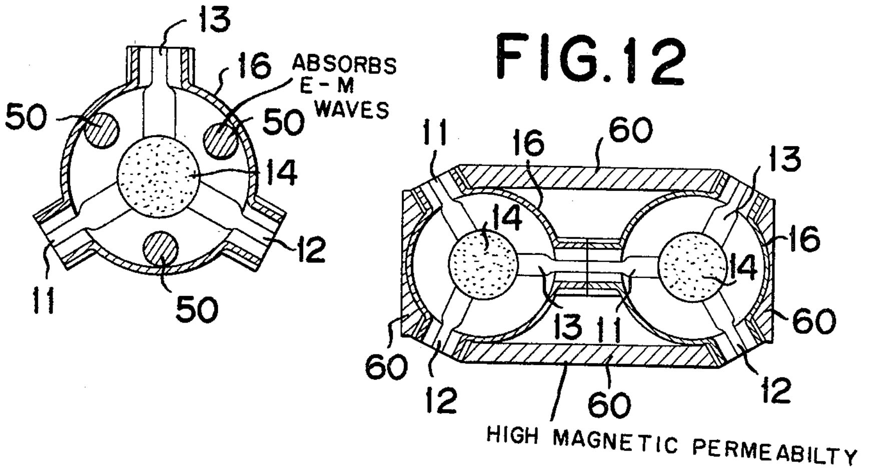

FIG. 5 presents a basic circuit of an amplifier using the present circulator;

FIG. 6 indicates a basic circuit of an isolator using the present circulators;

FIG. 7 is a longitudinal section of a junction type circulator according to another embodiment of the invention;

FIG. 8 is a perspective view of each component of the central conducting assembly of the circulator shown in FIG. 7;

FIG. 9 is a plan view of a modification of the central plate member of the central conducting assembly;

FIG. 10 is an equivalent circuit of the circulator of FIG. 7;

FIG. 11 is a cross section of the present circulator, the vessel of which particularly contains an electromagnetic wave absorbent; and FIG. 12 is a cross section of a 4-port circulator assembly formed from a combination of two circulators according to the invention, where the assembly is surrounded by a magnetic shield.

There will now be described an apparatus using an embodiment of the present invention by reference to FIGS. 1 to 6.

Throughout the figures, numeral 10 represents a central conducting assembly which comprises three terminals 11, 12 and 13 outwardly projecting in the radial direction at an equal interval of 120°. To both top and bottom sides of the circular central part of the central conducting assembly 10 are fitted two gyromagnetic disks 14 and 15, made of such as ferrite or polycrystalline yttrium iron garnet, each having substantially the same diameter as the circular central part of the assembly. While the ferrite member includes various kinds, the one used in this invention consists of barium ferrite. The ferrite disks 14 and 15 and the central conducting assembly 10 are housed in a cylindrical vessel 16 acting as a grounding member in such a manner that the end faces of both ferrite disks respectively contact the top and bottom inner walls of the vessel 16 and that the three terminals 11, 12 and 13 are respectively disposed in the three openings 17, 18 and 19 protruding outside of the circumferential wall of the vessel 16 at a prescribed space from the inner walls of said openings 17, 18 and 19.

The central conducting assembly 10 consists of the first conducting disk 20 having a protuberance used as a first terminal 11, which consists of a copper plate 0.2 mm. thick and 25 mm. in diameter for an electromagnetic wave of, for example, a 2,000 mHz. band, a second conducting disk 21 having the same thickness and diameter as the first disk 20 and provided with two protuberances used as second and third terminals 12 and 13 respectively which radially project outwardly at an interval of 120° and a dielectric disk 22 made of, for example, Teflon 0.1 mm. thick and 25 mm. in diameter which is sandwiched between the two conducting disks 20 and 21. As mentioned above, the protuberance 11 of the first disk 20 and the protuberances 12 and 13 of the second disk 21 are so combined as to project outwardly at an equal interval of 120°. Also the aforementioned three terminals may be prepared by forming two protuberances on the first conducting disk 20 and one protuberance on the second conducting disk 21. Further, it is permissible to laminate three conducting disks each having one protuberance with a dielectric member inserted therebetween. While the foregoing relates to a three-terminal circulator, it is possible to construct a circulator having four, five or more terminals by a proper combination of conducting disks and protuberances, and dielectric member.

With the circulator of the aforesaid arrangement, the central conducting assembly is divided into two or more conductive disks with a dielectric inserted therebetween. Since the prescribed terminals are spatially arranged, the flow of a direct current is cut off across these terminals. In other words, the prescribed terminals are electrically insulated from each other for a direct current component.

Figure 4:
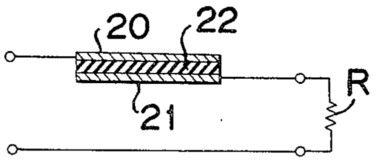
FIG. 4 shows an equivalent circuit of the circulator.
Figure 3:
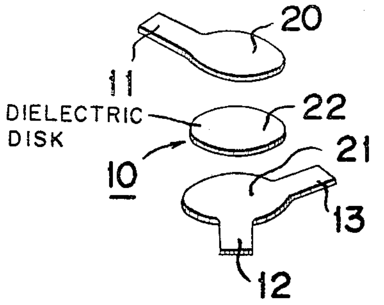
FIG. 3 is a perspective view of each component of the central conducting assembly of the circulator shown in FIGS. 1 and 2.

There will now be described the operational relationships of the central conducting assembly to a high frequency component. The equivalent circuit of the circulator according to the foregoing embodiment is presented in FIG. 4. Since a low load impedance is connected to the output terminal of the circulator, the equivalent circuit of the circulator may be deemed substantially the same as that of the transmission line of the characteristic impedance $Z_0$ terminating with a matching load. Since the input terminal of the equivalent circuit of the circulator of FIG. 4 is left open, the input impedance Z of the central conducting assembly consisting of two conducting plates may be expressed by the following equation, with the diameter of the conducting plate represented by D the thickness of the dielectric by $t$ and the dielectric constant by $\epsilon_d$:

$$Z=\sqrt{\frac{\mu_0}{\epsilon_d}}\cdot\frac{t}{D}\cot\cdot(\omega\sqrt{\mu_0\cdot\epsilon_d}D)$$

The central conducting assembly of the circulator is generally circular and its diameter is set as:

$$D\doteqdot\frac{3.7}{\omega\sqrt{\mu_f\cdot\epsilon_f}}$$

Therefore, $$Z=\sqrt{\frac{\mu_0}{\epsilon_d}}\cdot\frac{t}{D}\cot\cdot\left(3.7\sqrt{\frac{\mu_0\cdot\epsilon_d}{\mu_f\cdot\epsilon_f}}\right)$$

where:

$\omega$=angular frequency
$\mu_f$=magnetic permeability of ferrite
$\mu_0$=magnetic permeability in vacuum
$\epsilon_f$=dielectric constant of ferrite Accordingly, if the thickness $t$ of the dielectric is lessened, and the dielectric constant $\epsilon_d$ of the dielectric material is reduced to one-third of that of the ferrite, then the argument of cot. will approach $\pi/2$ rad., to render the value of Z extremely small, thus assuring that the central conducting assembly according to the present invention does not differ from the conventional type in any way with respect to the high frequency component. In fact, experiments prove that said central conducting assembly was not subject to any harmful effect. Actual determination of the properties of the circulator indicates that the three terminals displayed entirely to same non-reversible transmission properties, whether they were conducted or not for a direct current component, and that these properties fully agreed with those of the conventional circulator with respect to the insertion loss and bandwidth.

As mentioned above, the circulator of the present invention comprising a plurality of central conducting plates has an ability to separate a direct current component and also displays the same high frequency properties as the conventional type, so that it eliminates the necessity of providing a direct current separating means for the high frequency transmission line of a circulator type amplifier using a semiconductor negative resistance element, and can effectively impress the semiconductor element with a bias voltage by a simple construction. Since a high frequency amplifier can be formed with a minimum requirement of negative resistance elements and circulator, it is possible to integrate such an amplifier into a compact form and assemble a plurality of circulators into a single integrated body.

While the central conducting assembly is prepared, as described above, simply by superposing a plurality of conducting plates on each other, it may also consist of dielectric substrates coated with copper on both sides. The foregoing embodiment relates to a Y-shaped circulator using three conducting strip lines, but the present invention is also applicable to a circulator composed of two conducting microstrips.

FIG. 5 is a circuit diagram where a negative resistance element 23 is connected to the second terminal of the present circulator to form a negative resistance amplifier. FIG. 6 is a circuit diagram of an isolator where another circulator of the present invention is connected to the third terminal of the aforesaid amplifier through the first terminal 11' of the former, and a resistor 24 is connected to the second terminal 12' of the circulator thereby to obtain an output from the third terminal 13' thereof.

There will now be described another embodiment of the invention by reference to FIGS. 7 to 10. The same parts of this embodiment as those of the preceding one are denoted by the same numerals and explanation thereof is omitted. As in the apparatus of the preceding embodiment, the circulator consists of two gyromagnetic discs 14 and 15 and a central conducting assembly 30 supported therebetween, which are all housed in a vessel 16 acting as a grounding means. This central conducting assembly is formed of conducting capacitive disk members, for example, copper foil disks 31 and 32, 0.1 mm. thick which are so disposed as to face the ferrite disks 14 and 15 respectively, and central conducting disk member 35 sandwiched between the aforementioned disks 31 and 32 with dielectric disks 33 and 34 made of mica or the like lying therebetween. On the periphery of the central conducting disk member 35 are disposed at an equal space three outwardly extending protuberances to form first, second and third terminals 36, 37 and 38 respectively. As shown in FIG. 8, however, this central conducting disk 35 is cut in the center into two semicircular portions, one of which is provided with two protuberances 36 and 38, and the other with one protuberance 37. These semicircular portions are fixed in place at a space of about 0.5 mm. As illustrated in FIG. 9, however, the central conducting disk member 35 may be divided into three equal parts separated from each other at a space of 0.5 mm., in such a manner that each part is provided with one protuberance.

With the circulator of the aforementioned arrangement, there is positioned a thin dielectric disk 33 between the central conducting disk member 35 and the capacitive disk 31 and another thin dielectric disk 34 between the central conducting disk member 35 and the capacitive disk 32 so as to cause the three members, namely, the central conducting member, capacitive disk and dielectric disk, jointly to act as a condenser. The respective segments of the central conducting member 35 set apart by a separating channel are connected to each other by low impedance for an alternating current, but insulated from each other by said separating channel for a direct current component. Generally the ferrite has as high a dielectric constant as about 14, so that the effective radius is set at one-fourth of the wave-length. While said effective radius is related with the specific dielectric constant of the aforesaid thin dielectric disks 33 and 34, the electrical angle of the conducting line is proportional to the square root of the specific dielectric constant of said dielectric disks. With a specific dielectric constant of 5, 6 or less, the length of the line defined by parallel plates such as the central conducting disk member and capacitive disks will be reduced to less than one-eighth of the wavelength, and may be expressed by a concentrated constant equivalent circuit. FIG. 10 is an equivalent circuit across a pair of low loss transmission terminals.

On one portion of the transmission line, section 40 corresponds to the central conducting disk member 35 and section 41 to the capacitive disks 31 and 32. The letter C represents the static capicity across the central conducting disk member 35 and the respective capacitive disks 31 and 32.

With the specific dielectric constant of the dielectric 33 and 34 represented by $\epsilon$, the area of each conducting plate by A[$m$], and the distance between the conducting plates by $d$[$m$], then the static capacity C[F] may be expressed as follows:

$$C=K\frac{\epsilon A}{d} \qquad (1)$$

(where K is a constant).

Where a matching load 42 is connected to a pair of output terminals of the circulator, the impedance Z as viewed from the side of a pair of input terminals may, with the matching load represented by R[Ω], be expressed by the following formula relative to an angular frequency $\omega$[rad./sec.]:

$$Z=R+2\frac{(1)}{j\omega C} \qquad (2)$$

Therefore, if the distance $d$ between the respective conducting plates, namely the thickness of each thin dielectric plate is reduced, then the value of Z may be made to approach the value R of the resistance of the matching load with any desired precision.

When actual measurement was made with a 3,500 mc. electromagnetic wave of the properties of the circulator according to this embodiment comprising a ferrite disk 16 mm. in diameter and 2.5 mm. thick and the aforesaid central conducting assembly, then it was found that the three terminals of the circulator presented exactly the same non-reversible transmission properties, whether said terminals were conducted or not for a direct current component. Moreover, these properties were little inferior to those of the conventional circulator with respect to the magnitude of insertion loss and frequency bandwidth.

Moreover, since the central conducting assembly had an exactly symmetrical construction relative to the central conducting disks in the direction of an electrical field, namely, in a perpendicular direction to the ferrite disk, the leakage of electromagnetic waves was so extremely small that it was even difficult to detect, thus causing no disturbance in the circulator operation.

As mentioned above, the circulator of the present invention has been experimentally proved to be capable of displaying not only an ability to separate a direct current component but also the same properties as the prior art type.

Further, where the dielectric disk used was as thin as, for example, 0.05 mm., use of a copper plate, for example, 0.1 mm. thick remarkably reduced the unnecessary radiation of waveguide electromagnetic waves resulting from the unbalanced arrangement of a circulator having an asymmetrical construction, thus providing a good quality circulator.

Also the capacitive plate is only required to have a thickness just greater than the effective thickness depending on the frequency band used. In such a case the capacitive plate and thin dielectric plate may be vapor deposited on the surface of the ferrite plate. This makes the manufacture of a circulator remarkably easy and so well adapted for mass production.

The circulator of the present invention has an ability of separating a direct current component and exhibits the same high frequency properties as those of the conventional type. Accordingly a circulator type multi-step amplifier using a semiconductor resistance element, for example, a varactor (diode of variable capacity) eliminates the necessity of providing a direct current separating element in a connection line for high frequency transmission. Therefore the present circulator not only enables a bias voltage to be effectively supplied to a semiconductor element such as a varactor with a simple construction, but also said bias voltage to be most suitably regulated for each amplifying step. Since a high frequency amplifier can be assembled with a minimum requirement of negative resistance elements and circulators, it is possible to integrate such type of multi-step amplifier into a compact form and assemble a plurality of circulators into a single integrated body. The adapted capacitive plates and central conducting plate comprising spatially arranged input and output terminals are equally spaced from the grounding member, affording the advantage of easing the assembly of a circulator. While techniques of vapor deposition are used in the method of the present invention as described above, the thin dielectric plate and capacity plate may be formed of a copper coated dielectric substrate.

The foregoing embodiments relate to a Y-shaped circulator consisting of three conducting strip lines. However, the present invention is, of course, applicable to other types of junction circulator, for example, one composed of two conducting microstrip lines.

Further, the aforementioned embodiments represent the case where a ferromagnetic member is so disposed as to contact both capacitive plate and grounding means. However, if it is provided in a magnetic path formed in the joint thereof, said ferromagnetic member may be fitted by any means.

Figure 1:
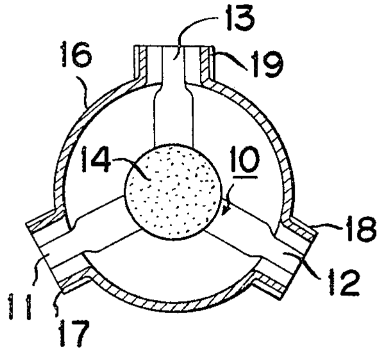
FIG. 1 is a cross section of a junction type circulator according to an embodiment of the present invention.
Figure 2:
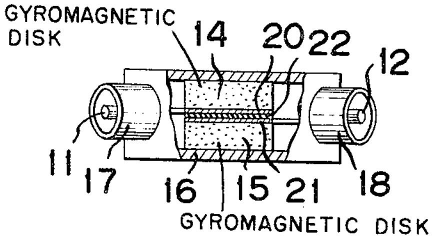
FIG. 2 is a longitudinal section of the circulator of FIG. 1 with a part broken away.

Unless the terminals of a junction type circulator are positioned exactly in the central part of a vessel or grounding member, more specifically in the central part of the outwardly projecting portions of the central conducting member, the signal energy will be reduced, leading to the occurrence of unnecessary resonance which will increase insertion loss of a circulator. This resonance unavoidably takes place as a practical problem due to unfavorable factors such design as or deformation errors. Particularly in the first mentioned embodiment of the present invention where two conducting plates are used, it is impossible to align all the terminals exactly in the central part of the grounding member, so that such resonance is likely to cause various operating difficulties. To eliminate these shortcomings, however, it is only required to dispose, as shown in FIG. 11, a resisting substance 50 capable of absorbing electromagnetic waves in the void space between the respective terminals of the central conducting member. This resisting substance may consist of a ferrite developing great saturated magnetization thereby to absorb unnecessary electromagnetic waves due to the resultant low magnetic field loss, or for this purpose, there may be used carbon as a resisting substance. Since this electromagnetic wave absorbent 50 is disposed at a place where there is present substantially no electromagnetic wave energy of a normal transmission mode occurring in a strip line, there is no insertion increase in the circulator due to the provision of such resisting substance.

Where two circulators of the present invention are used in combination, namely, where as shown in FIG. 12, a third terminal of, for example, a first circulator of FIG. 1 is electrically connected to a first terminal of a second circulator of the same type to form a 4-port circulator assembly, then there is obtained the advantage of preventing the magnetic fields formed in the respective circulators from being mutually affected, if these component circulators are surrounded with a substance 60 of high magnetic permeability such as Permalloy.

What is claimed is:

1. A junction type circulator adapted to be supplied with a D.C. magnetic field comprising: a central conducting assembly having at least three terminals; gyromagnetic bodies so arranged as to support the central part of the assembly from both the top and bottom sides thereof; and a vessel for housing the assembly and gyromagnetic bodies in a manner electrically to connect them, said vessel serving as a grounding means; wherein the central part of the central conducting member electrically insulates prescribed ones of said terminals from each other for a direct current component and electrically connects said prescribed terminals for a high frequency component.

2. The junction type circulator according to claim 1 wherein the central conducting assembly comprises a first conducting disk provided with one outwardly extending protuberance used as a first terminal and a second conducting disk provided with two outwardly extending protuberances used as second and third terminals respectively, the first, second and third terminals being arranged at an equal interval of 120°, and dielectric plates inserted between these conducting disks.

3. The junction type circulator according to claim 1 wherein the central conducting assembly comprises a pair of substantially semicircular conducting plates disposed at a prescribed space so as jointly to form a circle, said group of two semicircular conducting plates being provided with three outwardly extending protuberances arranged at an equal interval of 120°, two dielectric plates respectively positioned on th top and bottom sides of said pair of semi-circular conducting plates so as to support them therebetween and two conducting plates respectively contacting the top side of one of the dielectric plates and the bottom side of the other.

4. The junction type circulator according to claim 1 wherein the central conducting assembly comprises a group of substantially trisected conducting plates disposed at a prescribed space so as jointly to form a circle, said trisect circular conducting plates being respectively provided with one outwardly extending protuberance arranged at an equal interval of 120°, two dielectric plates positioned on the top and bottom sides of said group of trisect circular conducting plates so as to support them therebetween and two conducting plates respectively contacting the top side of one of the dielectric plates and the bottom side of the other.

5. The junction type circulator according to claim 1 wherein the vessel contains an electromagnetic wave absorbent therein.

6. The junction type circulator according to claim 1 wherein a plurality of circulators form a 4-port circulator assembly by having the individual terminals electrically connected to each other, said circulator assembly being surrounded with a substance of high magnetic permeability.

References Cited

UNITED STATES PATENTS

| | | | |
|---|---|---|---|
| 3,277,399 | 10/1966 | Simon | 333—1.1 |
| 3,377,570 | 4/1968 | Dean et al. | 333—1.1 |

HERMAN KARL SAALBACH, Primary Examiner

PAUL L. GENSLER, Assistant Examiner

U.S. Cl. X.R.

333—81